(12) United States Patent
Yang et al.

(10) Patent No.: US 11,831,165 B2
(45) Date of Patent: Nov. 28, 2023

(54) HIERARCHICAL CONTROL METHOD FOR ISLAND POWER GRID ENERGY STORAGE SYSTEM FOR INCREASING NEW ENERGY GENERATION FLUCTUATION

(71) Applicant: STATE GRID ZHEJIANG ELECTRIC POWER CO., LTD. TAIZHOU POWER SUPPLY COMPANY, Zhejiang (CN)

(72) Inventors: Jian Yang, Zhejiang (CN); Jianhua Lv, Zhejiang (CN); Guode Ying, Zhejiang (CN); Zuofu Jiang, Zhejiang (CN); Xin Wang, Zhejiang (CN); Haohua Wu, Zhejiang (CN); Yongling Li, Zhejiang (CN); Jianjun Zhu, Zhejiang (CN); Daojian Hong, Zhejiang (CN); Haili Liang, Zhejiang (CN); Huiqi Chen, Zhejiang (CN); Qingxi Cai, Zhejiang (CN); Baorong Liu, Zhejiang (CN); Yiting Hu, Zhejiang (CN); Xingbai Wang, Zhejiang (CN); Chuhang Xu, Zhejiang (CN); Lijun Zhu, Zhejiang (CN); Qiang Gao, Zhejiang (CN); Xinghui Jiang, Zhejiang (CN); Xiaofei Wang, Zhejiang (CN); Yin Lin, Zhejiang (CN); Xun Ma, Zhejiang (CN)

(73) Assignee: STATE GRID ZHEJIANG ELECTRIC POWER CO., LTD. TAIZHOU POWER SUPPLY COMPANY, Taizhou (CN)

( * ) Notice: Subject to any disclaimer, the term of this patent is extended or adjusted under 35 U.S.C. 154(b) by 426 days.

(21) Appl. No.: 17/252,294

(22) PCT Filed: Oct. 11, 2020

(86) PCT No.: PCT/CN2020/120256
§ 371 (c)(1),
(2) Date: Dec. 15, 2020

(87) PCT Pub. No.: WO2021/114849
PCT Pub. Date: Jun. 17, 2021

(65) Prior Publication Data
US 2021/0376614 A1  Dec. 2, 2021

(30) Foreign Application Priority Data
Dec. 12, 2019  (CN) .......................... 201911275796.0

(51) Int. Cl.
*H02J 3/38*  (2006.01)
*H02J 7/00*  (2006.01)
(Continued)

(52) U.S. Cl.
CPC ............ *H02J 3/388* (2020.01); *G05B 13/048* (2013.01); *H02J 3/008* (2013.01); *H02J 3/24* (2013.01);
(Continued)

(58) Field of Classification Search
CPC .... H02J 3/388; H02J 3/008; H02J 3/24; H02J 3/32; H02J 7/0048; H02J 7/00712;
(Continued)

(56) References Cited

U.S. PATENT DOCUMENTS

| 9,733,623 B2 * | 8/2017 | Yang ...................... G05B 13/02 |
| 2016/0043548 A1 * | 2/2016 | Bozchalui ................ H02J 3/28 700/291 |

(Continued)

FOREIGN PATENT DOCUMENTS

| CN | 104617590 A | * | 5/2015 | ................ H02J 3/32 |
| CN | 107294122 A | * | 10/2017 | ................ H02J 3/32 |

(Continued)

OTHER PUBLICATIONS

Y. Li, X. Fan, Z. Cai and B. Yu, "Optimal active power dispatching of microgrid and distribution network based on model predictive control," in Tsinghua Science and Technology, vol. 23, No. 3, pp. 266-276, Jun. 2018, doi: 10.26599/TST.2018.9010083. (Year: 2018).*

*Primary Examiner* — Mohammad Ali
*Assistant Examiner* — Dhruvkumar Patel

(57) ABSTRACT

A hierarchical control method for an island power grid energy storage system for increasing new energy generation
(Continued)

fluctuation is disclosed. The method includes implementing a rolling dispatch method based on an idea of model predictive control; comprehensively considering a response capability of the energy storage system to grid-wide economic dispatch instructions and life loss of energy storage lithium batteries, and constructing an objective function of an intraday control model of the energy storage system with economic optimization; and constructing, on a basis of satisfying the objective function of the intraday control model, a real-time control model of the energy storage system and solving the model, and determining charge and discharge plans of a lithium battery energy storage system and a supercapacitor energy storage system.

8 Claims, 3 Drawing Sheets

(51) Int. Cl.
  G05B 13/04 (2006.01)
  H02J 3/00 (2006.01)
  H02J 3/24 (2006.01)
  H02J 3/32 (2006.01)
  H02J 7/34 (2006.01)
(52) U.S. Cl.
  CPC .............. *H02J 3/32* (2013.01); *H02J 7/0048* (2020.01); *H02J 7/00712* (2020.01); *H02J 7/345* (2013.01); *H02J 2203/20* (2020.01); *H02J 2207/50* (2020.01)
(58) Field of Classification Search
  CPC .... H02J 7/345; H02J 2203/20; H02J 2207/50; H02J 3/28; G05B 13/048; G05B 2219/2639; G05B 15/02; Y02E 40/70; Y02E 60/00; Y02E 40/10; Y04S 10/50; Y04S 50/10; Y04S 40/20
  See application file for complete search history.

(56) References Cited

U.S. PATENT DOCUMENTS

| | | | | |
|---|---|---|---|---|
| 2016/0241042 A1* | 8/2016 | Mammoli | ............... | H02J 3/381 |
| 2018/0226800 A1* | 8/2018 | Bhattarai | .................. | H02J 3/28 |
| 2019/0042992 A1* | 2/2019 | Fife | ...................... | G05B 13/048 |
| 2019/0131923 A1* | 5/2019 | Hooshmand | ............ | H02J 3/003 |
| 2019/0165580 A1* | 5/2019 | Doherty | ............... | G05B 13/042 |
| 2019/0324487 A1* | 10/2019 | Elbsat | ....................... | G05F 1/66 |

FOREIGN PATENT DOCUMENTS

| | | | |
|---|---|---|---|
| CN | 107294122 A | | 10/2017 |
| CN | 109301853 A | * | 2/2019 |
| CN | 109301853 A | | 2/2019 |
| CN | 110071512 A | | 7/2019 |

* cited by examiner

HIERARCHICAL CONTROL METHOD FOR ISLAND POWER GRID ENERGY STORAGE SYSTEM FOR INCREASING NEW ENERGY GENERATION FLUCTUATION

FIELD

The disclosure belongs to the field of energy control, and particularly relates to a hierarchical control method for an island power grid energy storage system for increasing new energy generation fluctuation.

BACKGROUND

The scattered power users on the islands and the large power supply radius result in the weak grid structure of the island power grid, and there are widespread problems such as insufficient active and reactive power compensation capacity and weak voltage support capabilities. Incorporating new energy units such as wind and photovoltaics at the end of the island power grid can not only reduce power generation costs and reduce pollutant emissions caused by power generation, but also reduce the loss of the island power grid and enhance the voltage support capacity of the end of the island power grid. However, the inherent features of intermittency and randomness and the like of new energy power generation will aggravate the deterioration of the power quality at the end of the island power grid and seriously affect the safe and stable operation of the island power grid. Configuring an energy storage system at the end of an island power grid containing a new energy power generation system is an effective measure to solve the problem of new energy consumption and to suppress the fluctuation of new energy power generation.

At present, many domestic and foreign researches have been carried out on the energy storage system to stabilize the fluctuation of new energy power generation, and certain results have been obtained. The existing strategy can effectively smooth the short-term random fluctuation of the new energy power, and can improve the power quality of the new energy access point. However, due to the intermittent power generation of new energy, the output of new energy may change significantly on a long-term scale. The "short-sighted" of the existing energy storage control strategy may result in a large amount of wind and solar abandonment, which cannot meet the current demand for improving the capacity to consume new energy by using energy storage.

In terms of improving the power grid's capacity to consume new energy, the existing technology uses multiple methods from various aspects, such as demand response, network reconfiguration, and energy storage technology, considers the grid-wide overall situation, and promotes the consumption of new energy through the coordinated dispatch of the source, the network, the load and the storage. Energy storage system is one of the important supporting links of new energy consumption. In island power grids containing new energy, it is necessary to stand in the perspective of the entire island power grid and comprehensively consider the economic operation of the island power grid and the demand for new energy consumption to develop energy storage and dispatching control strategy. Therefore, in order to achieve the consumption of new energy and the suppression of fluctuations, the energy storage system must not only receive the dispatch instructions on the long-term scale of the island power grid, but also respond to the fluctuation suppression control instructions on the short-time scale. Existing research has not paid attention to this kind of problems exist in actual operation.

SUMMARY

In order to solve the shortcomings and deficiencies in the prior art, the present disclosure proposes a hierarchical control method for an island power grid energy storage system for increasing new energy generation fluctuation, which can solve the problem of new energy consumption and suppress the problem of new energy generation fluctuation.

Specifically, the hierarchical control method of the island power grid energy storage system for increasing new energy generation fluctuation proposed by embodiments of the present application includes:

implementing a rolling dispatch method based on an idea of model predictive control;

comprehensively considering a response capability of the energy storage system to grid-wide economic dispatch instructions and life loss of energy storage lithium batteries, and constructing an objective function of an intraday control model of the energy storage system with economic optimization; and constructing, on a basis of satisfying the objective function of the intraday control model, a real-time control model of the energy storage system and solving the model, and determining charge and discharge plans of a lithium battery energy storage system and a supercapacitor energy storage system.

Optionally, the implementing a rolling dispatch method based on an idea of model predictive control includes:

establishing a prediction model of island power grid energy storage; predicting, at a current time t and a state x(t), future states of the system according to the prediction model, and obtaining a dispatching plan for future n periods by combining an established dispatching model;

executing, by a dispatcher, only the dispatching plan at time t; and updating, at time t+1 and according to dispatch at time t, a system state to x(t+1), and repeating the above steps.

Optionally, the comprehensively considering a response capability of the energy storage system to grid-wide economic dispatch instructions and life loss of energy storage lithium batteries, and constructing an objective function of an intraday control model of the energy storage system with economic optimization includes:

considering a response capability of the energy storage system to grid-wide economic dispatch instructions and life loss of energy storage lithium batteries, and constructing an intraday control model of the energy storage system with economic optimization as the objective function; and determining constraints of the intraday control model of the energy storage system.

Optionally, the considering a response capability of the energy storage system to grid-wide economic dispatch instructions and life loss of energy storage lithium batteries, and constructing an intraday control model of the energy storage system with economic optimization as the objective function includes:

responding to the grid-wide economic dispatch instructions by lithium battery energy storage; therefore, in a day-ahead economic optimization dispatch layer, charge and discharge scheme of lithium battery system is formulated, with optimization variables being charge and discharge power of the lithium batteries; comprehensively considering the response capability of the energy storage system to the grid-wide economic dispatch instructions and the life loss of energy storage lithium batteries with economic optimization as the objective function:

$$\min f = C_1 + C_2$$

where $$C_1 = \sum_t \sum_l \alpha P_{loss,l,t} \Delta t, \quad C_2 = \sum_m R_m M_m + C_0;$$

where $f$ is an objective function of economic cost, and $C_1$ is economic cost converted by island power grid loss; $C_2$ is life damage cost of the energy storage lithium batteries in intraday charge and discharge dispatching plan; $\alpha$ is cost of unit grid loss; $P_{loss,l,t}$ is grid loss of line l at time t; $\Delta t$ is the control timing of this layer, taking 15 minutes, namely 0.25 hour; $R_m$ is the percentage of life damage of an energy storage lithium battery m; $M_m$ is the economic cost of the energy storage lithium battery m; and $C_0$ is the depreciation cost of the energy storage lithium batteries obtained according to the average life method.

Optionally, the determining constraints of the intraday control model of the energy storage system includes:

power flow constraints of the island power grid, node voltage constraints, line power flow constraints, and constraints of the energy storage lithium batteries.

Optionally, the constraints of the energy storage lithium batteries include:

constraints of charge and discharge power; an energy storage charge and discharge plan of this layer is consistent with energy storage charge and discharge scheme in grid-wide day-ahead economic optimization operation dispatching, constraining a rate of change in energy storage output from exceeding 20%, with constraint expression as:

$$0.8 P_{ESS,m,t,24h} \leq P_{ESS,m,t} \leq 1.2 P_{ESS,m,t,24h},$$

where $P_{ESS,m,t,24h}$ is the output of the lithium battery m at time t in day-ahead economic dispatching, and $P_{ESS,m,t}$ is the output of the lithium battery m at time t in the energy storage charge and discharge plan of this layer;

recursive constraints of the state of charge, with constraint expression as:

$$SOC_{m,t} = \begin{cases} SOC_{m,t-1} - P_{ESS,m,t} \eta_c / Q_m, & P_{ESS,m,t} \leq 0 \\ SOC_{m,t-1} - P_{ESS,m,t} / (\eta_d Q_m), & P_{ESS,m,t} > 0 \end{cases};$$

where $SOC_{m,t}$ is the state of charge of the lithium battery m at time t; $SOC_{m,t-1}$ is the state of charge of the lithium battery m at time t−1; $\eta_c$ and $\eta_d$ are the charge efficiency and discharge efficiency of the energy storage lithium battery, respectively; $Q_m$ is the capacity of the energy storage lithium battery m;

constraints of the state of charge, the constraint expression is $SOC_{min} \leq SOC_{m,t} \leq SOC_{max}$, where $SOC_{min}$ and $SOC_{max}$ are the upper limit and the lower limit of the state of charge of the energy storage lithium battery.

Optionally, the constructing, on a basis of satisfying the objective function of the intraday control model, a real-time control model of the energy storage system and solving the model, and determining charge and discharge plans of a lithium battery energy storage system and a supercapacitor energy storage system includes:

considering an effect of hybrid energy storage system in suppressing new energy fluctuation rate and the life damage of the lithium battery, and using low-pass filtering algorithm to process the dispatch instructions of the hybrid energy storage system;

filtering the new energy output twice; and allocating required power upon filtering, and determining the charge and discharge plans of the lithium battery energy storage system and the supercapacitor energy storage system.

Optionally, the filtering the new energy output twice includes:

a first filtering decomposes the new energy output into two parts: a high-frequency component and a low-frequency component:

$$P_{low1}(t) = (1-\alpha_1) P_{low1}(t-1) + \alpha_1 P_{nw}(t),$$

$$P_{high1}(t) = P_{nw}(t) - P_{low1}(t),$$

where $P_{nw}(t)$ is the new energy output at time t; $P_{low1}$ and $P_{high1}$ are the high-frequency component and a low-frequency component of the new energy output after the first filtering, respectively; $\alpha_1$ is the primary filter coefficient and the optimization variable of this layer, with a value range of (0,1/Ts], and Ts being a signal sampling period;

a second filtering filters the high-frequency component of the new energy output after the first filtering;

allocating the high-frequency component obtained from filtering to a supercapacitor, and the low-frequency component to the energy storage lithium battery:

$$P_{low2}(t) = (1-\alpha_2) P_{low2}(t-1) + \alpha_2 P_{high1}(t),$$

$$P_{high2}(t) = P_{high1}(t) - P_{low2}(t),$$

where $P_{low2}$ and $P_{high2}$ are the high-frequency and low-frequency components of the new energy output after the second filtering, respectively; $\alpha_2$ is a secondary filtering coefficient and also the optimization variable of this layer, and is the same as the value range of $\alpha_1$; in allocating power in the second filtering, if the power or capacity limitations of the supercapacitor and energy storage lithium battery result in failure to fully comply with the power allocating instructions for outputting, the unsatisfied output will be added to the low-frequency component $P_{low1}(t)$ obtained from the first filtering.

Optionally, the allocating required power upon filtering, and determining the charge and discharge plans of the lithium battery energy storage system and the supercapacitor energy storage system includes:

the obtained low-frequency component $P_{low1}(t)$ is comprehensive output of the new energy/energy storage system; in order to meet the requirements of new energy grid connection, the output fluctuation rate is defined as:

$$C_3 = \frac{1}{nP_N} \sum_{i=1}^{n} |P_{low1}(i) - P_{low1}(i-1)|,$$

where $C_3$ is the output fluctuation rate, $P_{low1}(i)$ is the comprehensive output of the new energy/energy storage system at timing i, $P_{low1}(i-1)$ is the comprehensive output of the new energy/energy storage system at timing i−1, n is the number of predicting timings, the predicting timing is 15 minutes, and a control timing is 3 minutes, so n takes 5, and $P_N$ is the rated output of new energy;

different dispatching schemes will have different impacts on the life of energy storage; since in the hybrid energy storage system, the life of lithium battery is much shorter than that of the supercapacitor, only the life damage of the lithium battery $C_4=\Delta L$ is considered;

in summary, the objective function $f$ of the real-time optimization control model of the energy storage system is:

$$\min f = C_3 + K_L C_4$$

$K_L$ is the proportional coefficient donating a ratio of the weight of lithium battery life to the weight of new energy output fluctuation rate.

Optionally, the method further includes constraint conditions for constructing the real-time optimization control model of the energy storage system, including:

constraints of charge and discharge power, with constraint expression as:

$$|P_{Li}(t)| \leq P_{Li,max}, \ |P_{SC}(t)| \leq P_{SC,max};$$

where $P_{Li}(t)$ and $P_{SC}(t)$ are the outputs of energy storage lithium battery and supercapacitor at time t, respectively; and $P_{Li,max}$ and $P_{SC,max}$ are the upper output limits of energy storage lithium battery and supercapacitor, respectively;

constraints of the state of charge, with constraint expression as:

$$SOC_{Li,min} \leq SOC_{Li}(t) \leq SOC_{Li,max},$$

$$SOC_{SC,min} \leq SOC_{SC}(t) \leq SOC_{SC,max},$$

$$|SOC_{Li,4}(T) - SOC_{Li}(T)| Mis,$$

$SOC_{Li}(t)$ and $SOC_{SC}(t)$ are the state of charge of the energy storage lithium battery and supercapacitor respectively at time t; $SOC_{Li,min}$ and $SOC_{Li,max}$ are the upper limit and the lower limit of the state of charge of the energy storage lithium battery, respectively; $SOC_{SC,min}$ and $SOC_{SC,max}$ are the upper limit and the lower limit of the state of charge of the supercapacitor, respectively; $SOC_{Li,4}(T)$ is the state of charge of the lithium battery at time T in the intraday optimal control model for the energy storage system; Mis is a constant donating the allowable error of the state of charge of the lithium battery between two layers.

The beneficial effects brought about by the technical solution provided by the present disclosure are as follows.

By proposing a hierarchical dynamic control method for energy storage systems based on model predictive control, including an energy storage system intraday dispatch method that responds to the grid-wide economic dispatch and a real-time control method for energy storage systems that suppresses new energy fluctuations, a precise energy storage control solution can be obtained.

BRIEF DESCRIPTION OF THE DRAWINGS

In order to explain the technical solution of the present disclosure more clearly, the drawings used in the description of the embodiments will be introduced briefly in the following. Obviously, the drawings in the following description are only some embodiments of the present disclosure. Ordinary technicians can obtain other drawings based on these drawings without creative work.

DETAILED DESCRIPTION

In order to make the structure and advantages of the present disclosure clearer, the present disclosure will be further described below in conjunction with the accompanying drawings.

Example One

The output of the new energy power generation system has high randomness and volatility, which has a greater impact on the economic and safe operation of the island power grid. The energy storage systems are effective measures in solving the problem of new energy consumption and suppressing the fluctuation of new energy power generation. In view of the above problems, the present disclosure establishes battery life evaluation models on a long time scale and a short time scale respectively; and proposes a hierarchical dynamic control method for energy storage systems based on model predictive control, including an intraday dispatch method in the energy storage system that responds to the grid-wide economic dispatch and a real-time control method for the energy storage system to suppress fluctuations in new energy sources, so as to obtain an accurate energy storage control plan.

Figure 1:
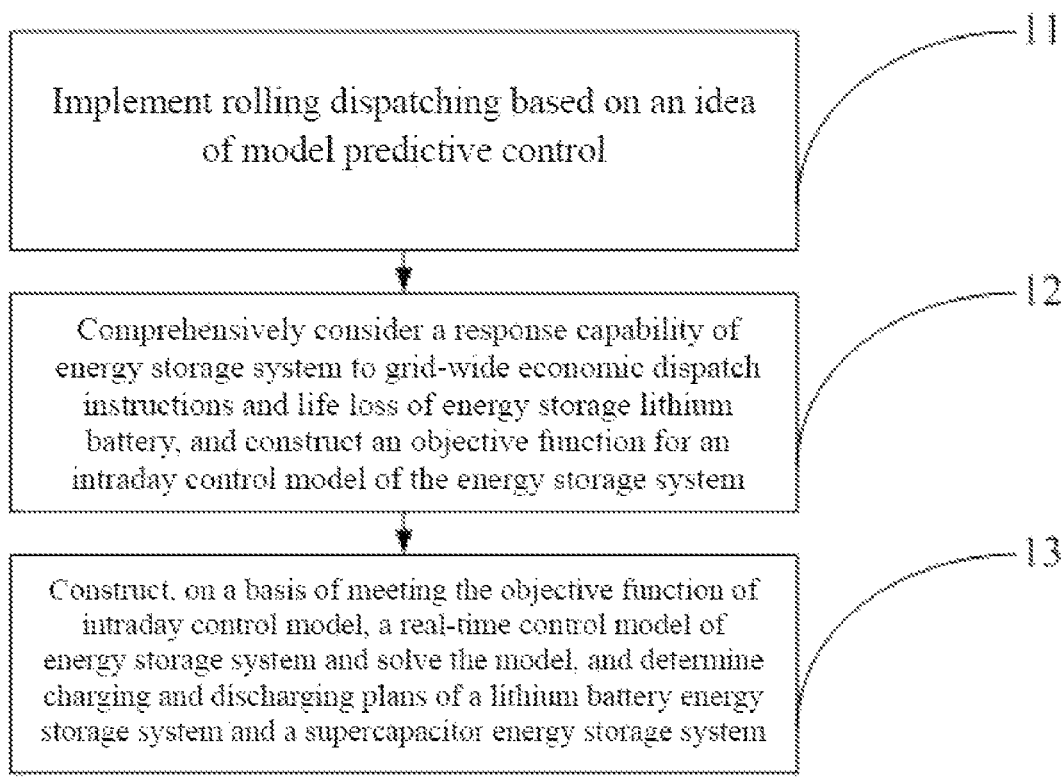
FIG. 1 is a schematic flow chart of a hierarchical control method for an island power grid energy storage system for increasing new energy generation fluctuation according to an embodiment.

Specifically, as shown in FIG. 1, the hierarchical control method of the island power grid energy storage system for increasing new energy generation fluctuation proposed by the embodiment of the present application includes:

11. implementing a rolling dispatch method based on an idea of model predictive control;

12. comprehensively considering a response capability of the energy storage system to grid-wide economic dispatch instructions and life loss of energy storage lithium batteries, and constructing an objective function of an intraday control model of the energy storage system with economic optimization; and 13. constructing, on a basis of satisfying the objective function of the intraday control model, a real-time control model of the energy storage system and solving the model, and determining charge and discharge plans of a lithium battery energy storage system and a supercapacitor energy storage system.

In implementation, Model Predictive Control (MPC) is a model-based closed-loop optimization control strategy. Its core idea is: future predictable dynamic models, online repeated optimization calculations and rolling implementation of the control effects, and feedback correction of model errors. MPC has the advantages of good control effect and strong robustness. It can effectively overcome the uncertainty, nonlinearity and parallelism of the process, and can conveniently handle various constraints in the controlled and manipulated variables of the process.

The rolling optimization method can be summarized as the following steps:

1) predicting, at a current time t and a state x(t), future states of the system according to the prediction model, and obtaining a dispatching plan for n periods in the future by combining an established dispatching model;

2) executing, by a dispatcher, only the dispatching plan at time t; and 3) updating, at time t+1 and according to dispatch at time t, a system state to x(t+1), and repeating the above steps. The present disclosure draws on the idea of rolling optimization, combines new energy predictive information, and aims at responding as much as possible to the grid-wide economic dispatch instructions, suppressing new energy output, and prolonging the service life of the energy storage system, and rolls out in the future reasonable hierarchical dynamic optimization control strategies for hybrid energy storage systems.

Optionally, the comprehensively considering a response capability of the energy storage system to grid-wide economic dispatch instructions and life loss of energy storage lithium batteries, and constructing an objective function of an intraday control model of the energy storage system with economic optimization includes:

considering a response capability of the energy storage system to grid-wide economic dispatch instructions and life loss of energy storage lithium batteries, and constructing an intraday control model of the energy storage system with economic optimization as the objective function; and determining constraints of the intraday control model of the energy storage system.

In the implementation, the control strategy of this layer will undertake the grid-wide day-ahead economic optimization operation dispatching layer, taking 4 hours as the predicting timing and 15 minutes as the control timing to formulate as charge and discharge plan for the energy storage system in a day.

On one hand, in the intraday control strategy, the formulated charge and discharge plan of the energy storage system should not be significantly different from the grid-wide day-ahead economic optimization operation dispatching plan, otherwise it will affect the grid-wide power flow characteristics and reduce the grid-wide economy. On the other hand, on the basis of complying with the grid-wide economic coordination, the formulated charge and discharge plan of the energy storage system minimizes the damage to the lithium iron phosphate battery caused by the charge and discharge actions.

The disclosure uses the island power grid loss to measure the response capability of the energy storage intraday control strategy to the grid-wide economic dispatch, and establishes an operating cost model that considers the island power grid loss and battery life damage. In the hybrid energy storage system, the lithium battery has a high energy density, which is mainly used for peak shaving and valley filling of new energy output, realizing the time and space translation of new energy output. The present disclosure will respond to the grid-wide economic dispatch instructions through lithium battery energy storage; therefore, in the day-ahead economic optimization dispatching layer, the charge and discharge plan of the lithium battery system is formulated, and the optimization variables are the charge and discharge power of the lithium batteries. Comprehensively consider the response capability of the energy storage system to grid-wide economic dispatch instructions and life loss of energy storage lithium batteries with economic optimization as the objective function:

$$\min f = C_1 + C_2,$$

where $$C_1 = \sum_t \sum_l \alpha P_{loss,l,t} \Delta t, \quad C_2 = \sum_m R_m M_m + C_0;$$

where $f$ is the objective function of economic cost, and $C_1$ is the economic cost converted by island power grid loss; $C_2$ is the life damage cost of the energy storage lithium batteries in intraday charge and discharge dispatching plan; $\alpha$ is the cost of unit grid loss; $P_{loss,l,t}$ is the grid loss of line l at time t; $\Delta t$ is the control timing of this layer, taking 15 minutes, namely 0.25 hour; $R_m$ is the percentage of life damage of an energy storage lithium battery m; $M_m$ is the economic cost of the energy storage lithium battery m; and $C_0$ is the depreciation cost of the energy storage lithium batteries obtained according to the average life method.

Optionally, the determining constraints of the intraday control model of the energy storage system includes:

power flow constraints of the island power grid, node voltage constraints, line power flow constraints, and constraints of the energy storage lithium batteries.

In the implementation, 1) for the power flow constraints of the island power grid, the constraint expression is:

$$\begin{cases} P_i = U_i \sum_j U_j(G_{ij}\cos\theta_{ij} + B_{ij}\sin\theta_{ij}) \\ Q_i = U_i \sum_j U_j(G_{ij}\sin\theta_{ij} - B_{ij}\cos\theta_{ij}) \end{cases};$$

where $P_i$ and $Q_i$ are the active and reactive power injections of the node i, respectively; $U_i$ and $U_j$ are the voltage amplitudes of the node i and the node j, respectively; $G_{ij}$ and $B_{ij}$ are the branch admittances of the node i and the node j, respectively; and $\theta_{ij}$ is the voltage phase angle difference between the node i and the node j.

2) For node voltage constraints, the constraint expression is:

$$U_{min} \leq U_i \leq U_{max};$$

where $U_{max}$ and $U_{min}$ are the upper limit and the lower limit of the voltage, respectively.

3) For line power flow constraints, the constraint expression is:

$$P_l \leq P_{l,max};$$

where $P_l$ is the power flow size on the line; and $P_{l,max}$ is the power flow upper limit of the line.

4) The constraints of the energy storage lithium batteries include:

constraints of charge and discharge power; an energy storage charge and discharge plan of this layer is consistent with an energy storage charge and discharge plan in grid-wide day-ahead economic optimization operation dispatching, constraining a rate of change in energy storage output from exceeding 20%, with constraint expression as:

$$0.8 P_{ESS,m,t,24h} \leq P_{ESS,m,t} \leq 1.2 P_{ESS,m,t,24h},$$

where $P_{ESS,m,t,24h}$ is the output of the lithium battery m at time t in day-ahead economic dispatching, and $P_{ESS,m,t}$ is the output of the lithium battery m at time t in the energy storage charge and discharge plan of this layer;

recursive constraints of the state of charge, with the constraint expression as:

$$SOC_{m,t} = \begin{cases} SOC_{m,t-1} - P_{ESS,m,t}\eta_c/Q_m, & P_{ESS,m,t} \leq 0 \\ SOC_{m,t-1} - P_{ESS,m,t}/(\eta_d Q_m), & P_{ESS,m,t} > 0 \end{cases};$$

where $SOC_{m,t}$ is the state of charge of the lithium battery m at time t; $SOC_{m,t-1}$ is the state of charge of the lithium battery m at time t−1; $\eta_c$ and $\eta_d$ are the charge efficiency and discharge efficiency of the energy storage lithium battery, respectively; $Q_m$ is the capacity of the energy storage lithium battery m;

constraints of the state of charge, the constraint expression is $SOC_{min} \leq SOC_{m,t} \leq SOC_{max}$, where $SOC_{min}$ and $SOC_{max}$ are the upper limit and the lower limit of the state of charge of the energy storage lithium battery.

Optionally, the constructing, on a basis of satisfying the objective function of the intraday control model, a real-time control model of the energy storage system and solving the model, and determining charge and discharge plans of a lithium battery energy storage system and a supercapacitor energy storage system includes:

considering an effect of hybrid energy storage system in suppressing new energy fluctuation rate and the life damage of the lithium battery, and using low-pass filtering algorithm to process the dispatch instructions of the hybrid energy storage system;

filtering the new energy output twice; and allocating required power upon filtering, and determining the charge and discharge plans of the lithium battery energy storage system and the supercapacitor energy storage system.

In the implementation, on the basis of responding to global economic dispatch, in order to stabilize the output of new energy and reduce the fluctuation rate of new energy output as much as possible, the real-time optimization control strategy of this layer of the energy storage system is formulated and implemented. The optimization control strategy of this layer undertakes the intraday control strategy of the energy storage system. It uses the complementarity of the energy characteristics and power characteristics of the hybrid energy storage system composed of lithium batteries and supercapacitors, comprehensively considers the effect of the hybrid energy storage system in stabilizing the fluctuation rate of new energy and the life damage of the lithium battery, uses low-pass filtering algorithm to process the dispatch instructions of the hybrid energy storage system, and filters the new energy output twice to allocate the required power and to develop charge and discharge plans for the lithium battery energy storage system and the supercapacitor energy storage system with time interval of 3 minutes in the next 15 minutes.

A first filtering decomposes the new energy output into two parts: a high-frequency component and a low-frequency component:

$$P_{low1}(t)=(1-\alpha_1)P_{low1}(t-1)+\alpha_1 P_{nw}(t),$$

$$P_{high1}(t)=P_{nw}(t)-P_{low1}(t),$$

where $P_{nw}(t)$ is the new energy output at time t; $P_{low1}$ and $P_{high1}$ are the high-frequency component and a low-frequency component of the new energy output after the first filtering, respectively; $\alpha_1$ is the primary filter coefficient and the optimization variable of this layer, with a value range of (0,1/Ts], and Ts being a signal sampling period;

a second filtering filters the high-frequency component of the new energy output after the first filtering;

allocating the high-frequency component obtained from filtering to a supercapacitor, and the low-frequency component to the energy storage lithium battery:

$$P_{low2}(t)=(1-\alpha_2)P_{low2}(t-1)+\alpha_2 P_{high1}(t),$$

$$P_{high2}(t)=P_{high1}(t)-P_{low2}(t),$$

where $P_{low2}$ and $P_{high2}$ are the high-frequency and low-frequency components of the new energy output after the second filtering, respectively; $\alpha_2$ is a secondary filtering coefficient and also the optimization variable of this layer, and is the same as the value range of $\alpha_1$; in allocating power in the second filtering, if the power or capacity limitations of the supercapacitor and energy storage lithium battery result in failure to fully comply with the power allocating instructions for outputting, the unsatisfied output will be added to the low-frequency component $P_{low1}(t)$ obtained from the first filtering.

The allocating required power upon filtering, and determining the charge and discharge plans of the lithium battery energy storage system and the supercapacitor energy storage system includes:

the obtained low-frequency component $P_{low1}(t)$ is comprehensive output of the new energy/energy storage system; in order to meet the requirements of new energy grid connection, the output fluctuation rate is defined as:

$$C_3 = \frac{1}{nP_N}\sum_{i=1}^{n}|P_{low1}(i)-P_{low1}(i-1)|,$$

where $C_3$ is the output fluctuation rate, $P_{low1}(i)$ is the comprehensive output of the new energy/energy storage system at timing i, $P_{low1}(i-1)$ is the comprehensive output of the new energy/energy storage system at timing i−1, n is the number of predicting timings, the predicting timing is 15 minutes, and a control timing is 3 minutes, so n takes 5, and $P_N$ is the rated output of new energy;

different dispatching schemes will have different impacts on the life of energy storage; since in the hybrid energy storage system, the life of lithium battery is much shorter than that of the supercapacitor, only the life damage of the lithium battery $C_4=\Delta L$ is considered.

In summary, the objective function $f$ of the real-time optimization control model of the energy storage system is:

$$\min f = C_3 + K_L C_4$$

$K_L$ is the proportional coefficient donating a ratio of the weight of lithium battery life to the weight of new energy output fluctuation rate.

The method further includes constraint conditions for constructing the real-time optimization control model of the energy storage system, including:

constraints of charge and discharge power, and the constraint expression is:

$$|P_{Li}(t)| \leq P_{Li,max}, |P_{SC}(t)| \leq P_{SC,max}$$

where $P_{Li}(t)$ and $P_{SC}(t)$ are the outputs of energy storage lithium battery and supercapacitor at time t, respectively; and $P_{Li,max}$ and $P_{SC,max}$ are the upper output limits of energy storage lithium battery and supercapacitor, respectively;

constraints of the state of charge, with the constraint expression as:

$$SOC_{Li,min} \leq SOC_{Li}(t) \leq SOC_{Li,max},$$

$$SOC_{SC,min} \leq SOC_{SC}(t) \leq SOC_{SC,max},$$

$$|SOC_{Li,4}(T)-SOC_{Li}(T)| \leq Mis,$$

$SOC_{Li}(t)$ and $SOC_{SC}(t)$ are the state of charge of the energy storage lithium battery and supercapacitor respectively at time t; $SOC_{Li,min}$ and $SOC_{Li,max}$ are the upper limit and the lower limit of the state of charge of the energy storage lithium battery, respectively; $SOC_{SC,min}$ and $SOC_{SC,max}$ are the upper limit and the lower limit of the state of charge of the supercapacitor, respectively; $SOC_{Li,4}(T)$ is the state of charge of the lithium battery at time T in the intraday optimal control model for the energy storage system; Mis is a constant donating the allowable error of the state of charge of the lithium battery between two layers.

The method proposed by the present disclosure is a real-time dispatch method for island power grids, which formulates charge and discharge plans for an actual lithium battery energy storage system and supercapacitor energy storage system and adjusts the plans in real time so as to optimize the grid-wide economy. What the present disclosure proposes is an operation for actual grid capacitance and power supply.

Taking the IEEE 14-node island power grid as an example, the method of the present disclosure is used to formulate an energy storage system charge and discharge plan. Distributed power supplies in the island power grid system include photovoltaics, wind power, and micro gas turbines, etc. Because the hierarchical dynamic optimization control model for the energy storage system proposed by the present disclosure undertakes the intraday economic dispatch of the island power grid, except the energy storage system nodes and new energy nodes, all the nodes' micro-gas turbine and load power values have been calculated by the day-ahead economic dispatch model as the known quantities of the calculation example. The reference capacity of the power grid is 100 MVA and the reference voltage is 23 kV. The hybrid energy storage system is configured at node 3. The total capacity of the energy storage lithium battery is 2.5 MWh, the maximum power is 1 MW, and the charge and discharge efficiency is 0.95; the total capacity of the supercapacitor is 10 kWh, the maximum power is 25 kW, and the charge and discharge efficiency is 0.9.

Two scenarios are set to illustrate the rationality of the intraday control strategy of the energy storage system proposed in the present disclosure. In scenario one, the impact of energy storage charge and discharge instructions on the life of lithium batteries is considered, which is just the method proposed in the present disclosure; in scenario two, the impact of energy storage charge and discharge instructions on the life of lithium batteries is not considered; however, both scenarios consider constraints such as energy storage charge and discharge power and the state of charge. In the next 4 hours, with 15 minutes as the time interval, from the energy storage charge and discharge scheme obtained through the economic dispatch model of the island power grid and the energy storage charge and discharge schemes obtained under scenario 1 and scenario 2, it can be seen that: since the dispatching power instructions will not involve the upper and lower power limits of the energy storage lithium battery and the upper and lower limits of the state of charge, so the charge and discharge scheme of the energy storage lithium battery in scenario 2 is completely arranged in accordance with the given grid-wide economic optimal power instructions. In scenario 1, the energy storage charge and discharge scheme will be revised on the basis of the grid-wide economic dispatch instructions to appropriately reduce the power fluctuation range of the energy storage lithium battery, thereby reducing the life damage caused to the lithium battery by the original charge and discharge power, and reducing the costs converted from the life damage. Its output curve is more "introverted", with less fluctuation, and less life damage to lithium batteries.

The economic costs of scenario one and scenario two are shown in Table 1. It can be seen from Table 1 that since one scenario considers the impact of energy storage charge and discharge instructions on the life of the lithium battery, the cost of the life damage of the lithium battery is lower. At the same time, because the power instructions of scenario 1 and scenario 2 are not much different from the grid-wide economic dispatch instructions, that is, within 10%, and the magnitude of the correction is much smaller than the original power magnitude of the island power grid, the loss of the island power grid caused by the power instructions of the above two strategies are not much different. In general, according to the method of the present disclosure in scenario 1, the total cost is reduced from RMB 4496.6 to 4406.7, which reduces the economic cost by about 2.04%.

|  | Life damage converted cost (RMB) | Grid loss converted cost (RMB) | Total costs (RMB) |
| --- | --- | --- | --- |
| Scenario 1 | 2992.6 | 1414.1 | 4406.7 |
| Scenario 2 | 3083.0 | 1413.6 | 4496.6 |

In order to make the results more obvious, the present disclosure investigates the new energy output in the next 75 minutes. In order to ensure that the control strategy of this layer does not have a greater impact on the upper control strategy, the maximum charge and discharge power of the energy storage lithium battery is set to 10 kW, and the maximum charge and discharge power of the supercapacitor is 25 kW. In the real-time optimization control strategy of the energy storage system, because the lithium battery life evaluation index and the fluctuation rate evaluation index differ by several orders of magnitude, it is necessary to specify the adjustment range of the weight ratio $K_L$ of the lithium battery life to the fluctuation rate. In this example, the value range of $K_L$ is [105,106] would be appropriate.

Figure 2:
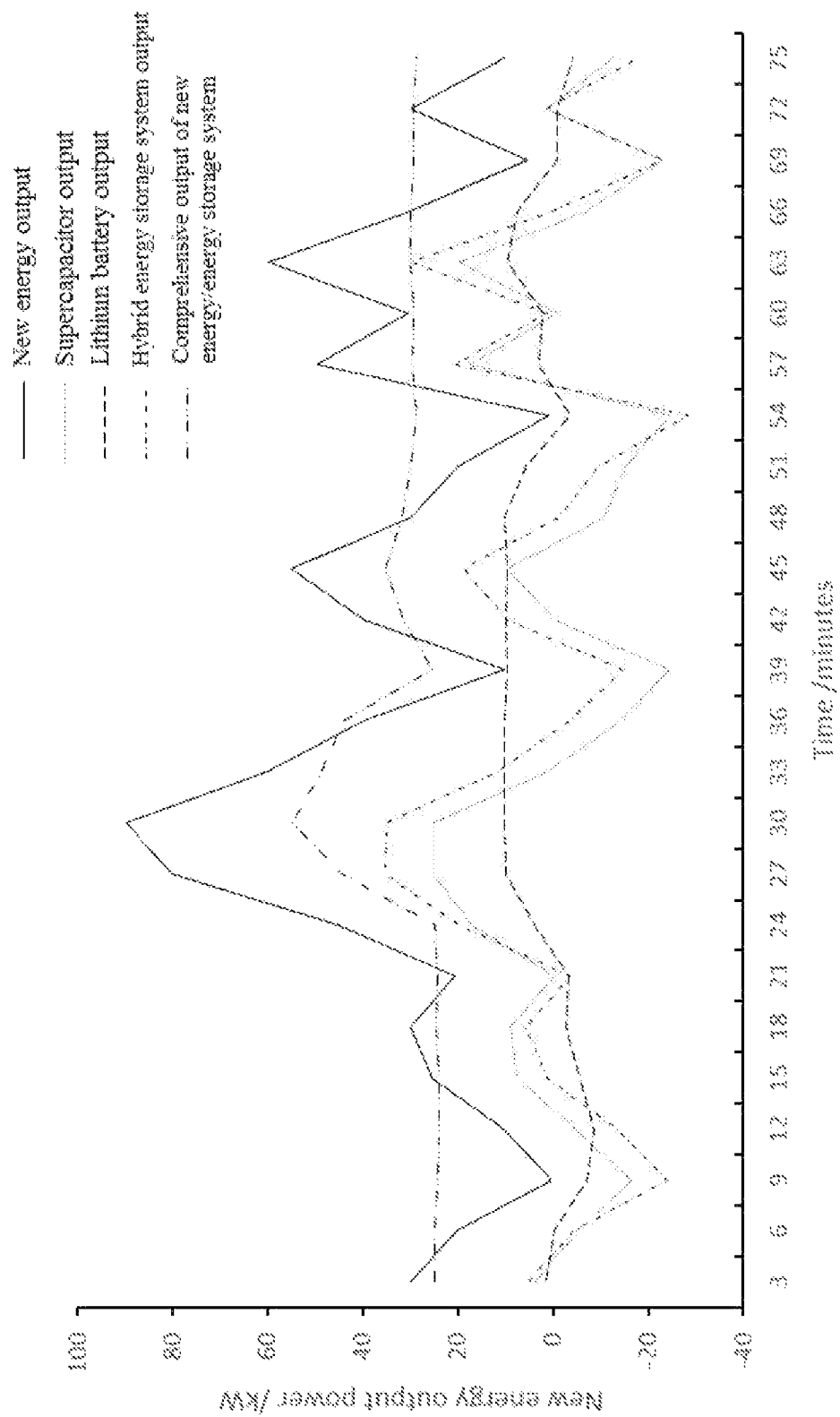
FIG. 2 is a schematic diagram of the simulation result of the real-time control strategy of the energy storage system when KL is 105 according to an embodiment.
Figure 3:
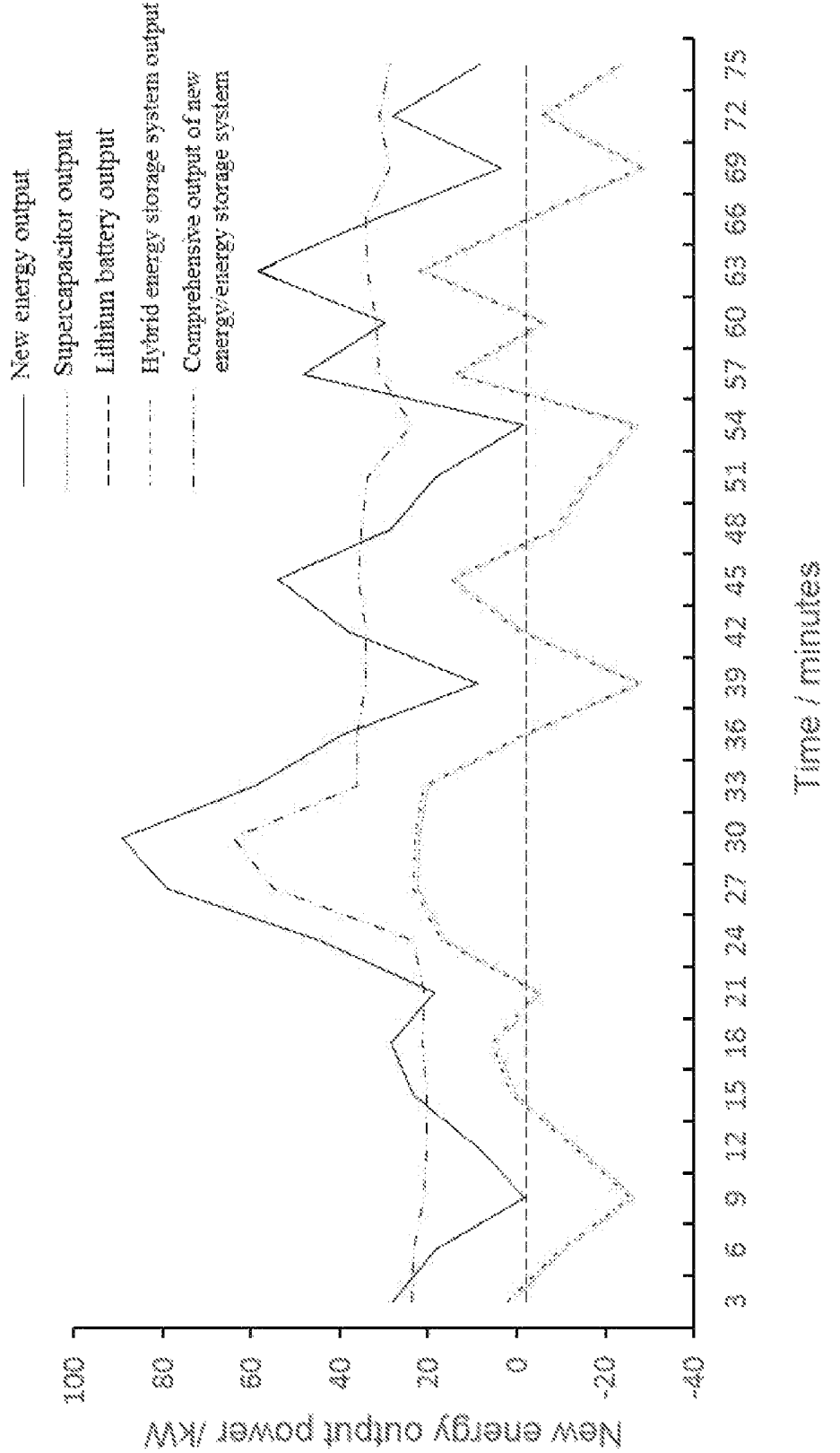
FIG. 3 is a schematic diagram of the simulation result of the real-time control strategy of the energy storage system when KL is 106 according to an embodiment.

When the weight ratio of the lithium battery life to the fluctuation rate is 105:1, the two filter coefficients are 0.028195 and 0.27413, respectively, and the new energy/energy storage system output fluctuation rate is 3.32%. The simulation results are shown in FIG. 2. When the weight ratio of the lithium battery life to the fluctuation rate is 106:1, the two filter coefficients are 0.0896 and 0, respectively, and the output fluctuation rate of the new energy/energy storage system is 4.56%. The simulation results are shown in FIG. 3. It can be seen from FIG. 2 and FIG. 3 that the real-time control of the energy storage system can significantly reduce the volatility of the new energy power generation system. At the same time, as the weight ratio of the lithium battery life to the fluctuation rate increases, the power instructions issued to the energy storage lithium battery will become more and more gentle, and supercapacitors will take more on the task of stabilizing the output power of new energy; on the other hand, due to the limited charge and discharge power and capacity of supercapacitors, the output power of new energy cannot be completely suppressed. Therefore, the new energy/energy storage system output fluctuation rate will also increase.

The serial numbers in the above embodiments are only for description, and do not represent the sequence of the assembly or use of the components.

The above are only the embodiments of the present disclosure and are not intended to limit the present disclosure. Any modification, equivalent replacement, improvement, etc., made within the spirit and principle of the present disclosure should be included in the protection scope of the present disclosure.

The invention claimed is:

1. A hierarchical control method for an island power grid energy storage system for increasing new energy generation fluctuation, comprising:

implementing a rolling dispatch method based on an idea of model predictive control;
comprehensively considering a response capability of the energy storage system to grid-wide economic dispatch instructions and life loss of energy storage lithium batteries, and constructing an objective function of an intraday control model of the energy storage system with economic optimization; and
constructing, on a basis of satisfying the objective function of the intraday control model, a real-time control model of the energy storage system and solving the model, and determining charge and discharge plans of a lithium battery energy storage system and a supercapacitor energy storage system;
wherein the charge and discharge plans of the lithium battery energy storage system and the supercapacitor energy storage system are implemented to reduce fluctuation of power of an energy storage lithium battery;
wherein the constructing, on a basis of satisfying the objective function of the intraday control model, a real-time control model of the energy storage system and solving the real-time control model, and determining charge and discharge plans of a lithium battery energy storage system and a supercapacitor energy storage system comprises:
considering an effect of hybrid energy storage system in suppressing energy fluctuation rate and the life damage of lithium batteries, and using low-pass filtering algorithm to process the dispatch instructions of the hybrid energy storage system;
filtering an energy output twice; and
allocating required power upon filtering, and determining the charge and discharge plans of the lithium battery energy storage system and the supercapacitor energy storage system;
wherein the filtering the energy output twice comprises:
a first filtering decomposes the energy output into two parts: a high-frequency component and a low-frequency component:

$$P_{low1}(t)=(1-\alpha_1)P_{low1}(t-1)+\alpha_1 P_{nw}(t),$$

$$P_{high1}(t)=P_{nw}(t)-P_{low1}(t),$$

where $P_{nw}(t)$ is an energy output at time t; $P_{low1}$ and $P_{high1}$ are the high-frequency component and the low-frequency component of the energy output after the first filtering, respectively; $\alpha_1$ is the primary filter coefficient and also an optimization variable of this layer, with a value range of $(0,1/Ts]$, and Ts being a signal sampling period;
a second filtering filters the high-frequency component of the energy output after the first filtering;
allocating the high-frequency component obtained from filtering to a supercapacitor, and the low-frequency component to the energy storage lithium battery:

$$P_{low2}(t)=(1-\alpha_2)P_{low2}(t-1)+\alpha_2 P_{high1}(t),$$

$$P_{high2}(t)=P_{high1}(t)-P_{low2}(t),$$

where $P_{low2}$ and $P_{high2}$ are the high-frequency and low-frequency components of the energy output after the second filtering, respectively; $\alpha_2$ is a secondary filtering coefficient and also the optimization variable of this layer, and is the same as the value range of $\alpha_1$; in allocating power in the second filtering, if the power or capacity limitations of the supercapacitor and energy storage lithium battery result in failure to fully comply with power allocating instructions for outputting, the unsatisfied output will be added to the low-frequency component $P_{low1}$ (t) obtained from the first filtering.

2. The hierarchical control method for increasing fluctuations in renewable energy power generation of an island power grid energy storage system according to claim 1, wherein the implementing a rolling dispatch method based on an idea of model predictive control comprises:
establishing a prediction model of island power grid energy storage; predicting, at a current time t and a state x(t), future states of the system according to the prediction model, and obtaining a dispatching plan for future n periods by combining an established dispatching model;
executing, by a dispatcher, only the dispatching plan at time t; and
updating, at time t+1 and according to dispatch at time t, a system state to x(t+1), and repeating the above steps.

3. The hierarchical control method for increasing fluctuations in renewable energy power generation of an island power grid energy storage system according to claim 1, wherein the comprehensively considering a response capability of the energy storage system to grid-wide economic dispatch instructions and life loss of energy storage lithium batteries, and constructing an objective function of an intraday control model of the energy storage system with economic optimization comprises:
considering a response capability of the energy storage system to grid-wide economic dispatch instructions and life loss of energy storage lithium batteries, and constructing the intraday control model of the energy storage system with economic optimization as the objective function; and
determining constraints of the intraday control model of the energy storage system.

4. The hierarchical control method for increasing fluctuations in renewable energy power generation of an island power grid energy storage system according to claim 3, wherein the considering a response capability of the energy storage system to grid-wide economic dispatch instructions and life loss of energy storage lithium batteries, and constructing an intraday control model of the energy storage system with economic optimization as the objective function comprises:
responding to the grid-wide economic dispatch instructions by lithium battery energy storage; therefore, in a day-ahead economic optimization dispatch layer, charge and discharge scheme of a lithium battery system is formulated, with optimization variables being charge and discharge power of the lithium batteries; comprehensively considering the response capability of the energy storage system to the grid-wide economic dispatch instructions and the life loss of energy storage lithium batteries with economic optimization as the objective function:

$$\min f = C_1 + C_2,$$

$$\text{where} \quad C_1 = \sum_t \sum_l \alpha p_{loss,l,t} \Delta t, \; C_2 = \sum_m R_m M_m + C_0;$$

where $f$ is an objective function of economic cost, and $C_1$ is economic cost converted by island power grid loss; $C_2$ is life damage cost of the energy storage lithium batteries in an intraday charge and discharge dispatching plan; α is cost of unit grid loss; $P_{loss,l,t}$ is grid loss of line l at time t; Δt is a control timing of this layer, taking 15 minutes, namely 0.25 hour; $R_m$ is a percentage of life damage of an energy storage lithium battery m; $M_m$ is economic cost of the energy storage lithium battery m; and $C_0$ is depreciation cost of the energy storage lithium batteries obtained according to an average life method.

5. The hierarchical control method for increasing fluctuations in renewable energy power generation of an island power grid energy storage system according to claim 3, wherein the constraints of the intraday control model of the energy storage system comprise:

power flow constraints of the island power grid, node voltage constraints, line power flow constraints, and constraints of the energy storage lithium batteries.

6. The hierarchical control method for increasing fluctuations in renewable energy power generation of an island power grid energy storage system according to claim 5, wherein the constraints of the energy storage lithium batteries comprise:

constraints of charge and discharge power; an energy storage charge and discharge plan of this layer is consistent with an energy storage charge and discharge plan in grid-wide day-ahead economic optimization operation dispatching, constraining a rate of change in energy storage output from exceeding 20%, with constraint expression as:

$$0.8 P_{ESS,m,t,24h} \leq P_{ESS,m,t} \leq 1.2 P_{ESS,m,t,24h},$$

where $P_{ESS,m,t,24h}$ is an output of the lithium battery m at time t in day-ahead economic dispatching, and $P_{ESS,m,t}$ is an output of the lithium battery m at time t in the energy storage charge and discharge plan of this layer;

recursive constraints of a state of charge, with constraint expression as:

$$SOC_{m,t} = \begin{cases} SOC_{m,t-1} - P_{ESS,m,t} \eta_c / Q_m, & P_{ESS,m,t} \leq 0 \\ SOC_{m,t-1} - P_{ESS,m,t} / (\eta_d Q_m), & P_{ESS,m,t} > 0 \end{cases},$$

where $SOC_{m,t}$ is the state of charge of the lithium battery m at time t; $SOC_{m,t-1}$ is the state of charge of the lithium battery m at time t−1; $\eta_c$ and $\eta_d$ are charge efficiency and discharge efficiency of the energy storage lithium battery, respectively; $Q_m$ is a capacity of the energy storage lithium battery m; and constraints of the state of charge, the constraint expression is $SOC_{min} \leq SOC_{m,t} \leq SOC_{max}$, where $SOC_{min}$ and $SOC_{max}$ are an upper limit and a lower limit of the state of charge of the energy storage lithium battery.

7. The hierarchical control method for increasing fluctuations in renewable energy power generation of an island power grid energy storage system according to claim 1, wherein the allocating required power upon filtering, and determining the charge and discharge plans of the lithium battery energy storage system and the supercapacitor energy storage system comprises:

the obtained low-frequency component $P_{low1}(t)$ is a comprehensive output of the new energy/energy storage system; in order to meet requirements of new energy grid connection, an output fluctuation rate is defined as:

$$C_3 = \frac{1}{nP_N} \sum_{i=1}^{n} |P_{low1}(i) - P_{low1}(i-1)|,$$

where $C_3$ is the output fluctuation rate, $P_{low1}(i)$ is a comprehensive output of the new energy/energy storage system at timing i, $P_{low1}(i-1)$ is a comprehensive output of the new energy/energy storage system at timing i−1, n is the number of predicting timings, the predicting timing is 15 minutes, and a control timing is 3 minutes, so n takes 5, and $P_N$ is new energy rated output;

different dispatching schemes will have different impacts on life of energy storage; since in the hybrid energy storage system, the life of the lithium battery is much shorter than that of the supercapacitor, only the life damage of the lithium battery $C_4 = \Delta L$ is considered;

in summary, the objective function $f$ of the real-time optimization control model of the energy storage system is:

$$\min f = C_3 + K_L C_4$$

where $K_L$ is a proportional coefficient donating a ratio of weight of lithium battery life to weight of new energy output fluctuation rate.

8. The hierarchical control method for increasing fluctuations in renewable energy power generation of an island power grid energy storage system according to claim 7, further comprising constraint conditions for constructing the real-time control model of the energy storage system, the constraint conditions comprising:

constraints of charge and discharge power, with constraint expression as:

$$|P_{Li}(t)| \leq P_{Li,max}, |P_{SC}(t)| \leq P_{SC,max};$$

where $P_{Li}(t)$ and $P_{SC}(t)$ are outputs of the energy storage lithium battery and the supercapacitor at time t, respectively; and $P_{Li,max}$ and $P_{SC,max}$ are upper output limits of the energy storage lithium battery and the supercapacitor, respectively;

constraints of the state of charge, with constraint expression as:

$$SOC_{Li,min} \leq SOC_{Li}(t) \leq SOC_{Li,max},$$

$$SOC_{SC,min} \leq SOC_{SC}(t) \leq SOC_{SC,max},$$

$$|SOC_{Li,4}(T) - SOC_{Li}(T)| Mis,$$

$SOC_{Li}(t)$ and $SOC_{SC}(t)$ are the states of charge of the energy storage lithium battery and the supercapacitor at time t, respectively; $SOC_{Li,min}$ and $SOC_{Li,max}$ are an upper limit and a lower limit of the state of charge of the energy storage lithium battery, respectively; $SOC_{SC,min}$ and $SOC_{SC,max}$ are an upper limit and a lower limit of the state of charge of the supercapacitor, respectively; $SOC_{Li,4}(T)$ is the state of charge of the lithium battery at time T in the intraday optimal control model for the energy storage system; Mis is a constant donating an allowable error of the state of charge of the lithium battery between two layers.

* * * * *